United States Patent
Hirano et al.

[11] Patent Number: 6,027,553
[45] Date of Patent: Feb. 22, 2000

[54] AIR FILTER UNIT AND METHOD FOR MANUFACTURING THE SAME

[75] Inventors: Seiichi Hirano; Toshio Kusumi; Tomizou Soda, all of Osaka, Japan

[73] Assignee: Daikin Industries, Ltd., Osaka, Japan

[21] Appl. No.: 09/057,165

[22] Filed: Apr. 8, 1998

[30] Foreign Application Priority Data

Apr. 11, 1997 [JP] Japan .................................. 9-094196

[51] Int. Cl.⁷ .......................... B01D 29/07; B01D 46/10
[52] U.S. Cl. ............................. 95/283; 95/285; 55/385.2; 55/497; 55/499; 55/501; 55/502; 55/524; 55/528; 55/DIG. 5
[58] Field of Search ............................ 95/273, 283, 285; 96/108; 55/385.1, 385.2, 422, 478–481, 483, 492, 497–499, 501, 502, 524, 528, DIG. 5

[56] References Cited

U.S. PATENT DOCUMENTS

| | | | |
|---|---|---|---|
| 2,728,407 | 12/1955 | Squier | 55/480 X |
| 3,246,758 | 4/1966 | Wagner | 96/108 X |
| 3,683,596 | 8/1972 | Ashley | 55/481 X |
| 4,025,679 | 5/1977 | Denny | 55/528 X |
| 4,075,106 | 2/1978 | Yamazaki | 55/498 X |
| 4,187,390 | 2/1980 | Gore | 55/528 X |
| 4,488,966 | 12/1984 | Schaeffer | 55/498 X |
| 4,707,167 | 11/1987 | Saito et al. | 55/385.2 X |
| 4,877,433 | 10/1989 | Oshitari | 55/528 X |
| 4,878,930 | 11/1989 | Manniso et al. | 55/498 X |
| 4,961,764 | 10/1990 | Develle et al. | 55/385.2 X |
| 4,983,434 | 1/1991 | Sassa | 55/528 X |
| 5,096,473 | 3/1992 | Sassa et al. | 95/285 X |
| 5,098,767 | 3/1992 | Linnersten | 95/273 |
| 5,207,812 | 5/1993 | Tronto et al. | 55/498 |
| 5,234,739 | 8/1993 | Tanaru et al. | |
| 5,236,480 | 8/1993 | Svensson et al. | 55/497 X |
| 5,409,515 | 4/1995 | Yamamoto et al. | |
| 5,470,485 | 11/1995 | Morweiser et al. | 95/273 X |
| 5,507,847 | 4/1996 | George et al. | 55/497 X |
| 5,527,569 | 6/1996 | Hobson et al. | 55/528 X |
| 5,624,478 | 4/1997 | Patapanian et al. | 96/108 |
| 5,837,040 | 11/1998 | Caughron et al. | 55/385.2 X |

FOREIGN PATENT DOCUMENTS

| | | |
|---|---|---|
| 51-134475 | 11/1976 | Japan . |
| 5-184844 | 7/1993 | Japan . |
| 5-202217 | 8/1993 | Japan . |
| 6-218899 | 8/1994 | Japan . |
| 8-325890 | 12/1996 | Japan . |
| WO 91/08829 | 6/1991 | WIPO . |
| WO 93/23137 | 11/1993 | WIPO . |
| WO 94/16802 | 8/1994 | WIPO . |
| WO 94/16891 | 8/1994 | WIPO . |

OTHER PUBLICATIONS

Japan Air Cleaning Association/Filter Medium Standard Commission, Method of Testing Flammability of Filter Medium Used in Air Cleaner, Nov. 4, 1977 (w/partial English translation).

*Primary Examiner*—Robert Spitzer
*Attorney, Agent, or Firm*—Merchant & Gould P.C.

[57] ABSTRACT

An air filter unit in which the generation of organic substances is restrained by controlling at least the amount of organic substances detected from a square test piece of 5×5 cm (25 cm²) of a filter medium so as to be 100 ng or less in the total amount of organic substances detected from the whole air filter unit at a temperature of 40° C. before using. The air filter unit is assembled by housing a filter medium that has been bent in a waveform in a frame composed of 4 outer frame members and sealing the gap between the frame and the filter medium using a sealing compound. Organic substances adhering to the air filter unit are removed by blowing a cleaned air heated at 80° C. against the air filter unit at a velocity of 50 ml/min for 60 minutes. Then, an air suction port and an air exhaust port of the air filter unit are sealed with a film (for example, a PET film) which keeps the unit from contacting with organic substances and from which organic substances are not generated.

23 Claims, 4 Drawing Sheets

AIR FILTER UNIT AND METHOD FOR MANUFACTURING THE SAME

FIELD OF THE INVENTION

The present invention relates to an air filter unit used in a clean room or the like in the manufacture of electrical/electronic parts or the like such as, for example, semiconductor, liquid crystal or the like, and to a method for manufacturing the same. More particularly, the present invention relates to an air filter unit in which the generation of organic substances is restrained and to a method for manufacturing the same.

BACKGROUND OF THE INVENTION

The applicant has already proposed a polytetrafluoroethylene (hereafter referred to as "PTFE") porous membrane as a filter medium used for cleaning the air in a clean room or the like (for example, JP5-202217A). The applicant has also proposed to protect the PTFE porous membrane by laminating thermoplastic, such as a spunbonded nonwoven fabric using long fibers having a core-sheath structure, on both sides of the PTFE porous membrane in order to prevent damage and the occurrence of pin holes, since the membrane itself is thin (JP6-218899A). A filter medium using such a PTFE porous membrane has an excellent property, since its surface area is greater compared to that of a conventional filter medium.

However, the applicant found in his further study that a trace amount of total organic carbon (hereafter referred to as "TOC", wherein the TOC means a total amount of various gaseous organic substances such as, for example, dodecane, tridecane, butyl hydroxytoluene (BHT), phosphate ester, dioctyl phthalate, siloxane or the like) was generated in using the conventional filter medium proposed in JP5-202217A and JP6-218899A mentioned above, for example, as an air filter in a clean room. In manufacturing semiconductor, liquid crystal or the like, the product quality might be deteriorated by the presence of high TOC in a cleaned air space such as a clean room or the like. An air filter unit is composed of not only a filter medium but also members such as a frame housing for supporting the filter medium, a sealing compound that seals the gap between the frame and the filter medium, a gasket, a spacer, a separator and the like. Therefore, the generation of organic substances from these members should be also taken into account.

In order to solve this problem, it can be considered whether to construct an air filter unit composed of members from which little organic substances are generated. However, the generation of organic substances cannot be actually restrained efficiently merely through such a method.

Thus, an object of the present invention is to provide an air filter unit in which the generation of organic substances is restrained and a method for manufacturing the same.

SUMMARY OF THE INVENTION

In order to achieve the object mentioned above, an air filter unit according to the present invention has a configuration in which at least the amount of organic substances detected from a square test piece of 5×5 cm (25 cm$^2$) of a filter medium is 100 ng or less in the total amount of organic substances detected from the whole air filter unit under the condition of a temperature of 40° C. before using. The preferable amount of organic substances detected from the square test piece of 5×5 cm (25 cm$^2$) of the filter medium is 80 ng or less, most preferably, 40 ng or less.

In the air filter unit according to the present invention, the detected amount of organic substances before using is defined. That is to say, even if the members from which a small amount of organic substances are generated are selected and used as members included in the air filter unit, organic substances present in the atmosphere start to adhere to the air filter unit right after the manufacture in a current manufacturing (assembling) environment of the air filter unit. The adhering organic substances are separated again by using the air filter unit to which organic substances have adhered, and therefore a clean room or the like might be contaminated. So, in the present invention, at least the amount of organic substances generated from a filter medium to which organic substances adhere most easily in the amounts of organic substances of an air filter unit before using is controlled, since the surface area of the filter medium accounts for most parts (about 90% or more) of the surface area of the whole air filter unit. This problem regarding the adhering organic substances is an acute problem that occurs especially in a high efficiency filter medium (pressure loss: 10–100 mmH$_2$O) using a PTFE drawn porous membrane. The PTFE drawn porous membrane has a configuration in which fibrillated PTFE gets tangled together by drawing a PTFE film at the drawn area rate of at least 100 times. Its surface area is very big. In a filter medium using such a PTFE drawn porous membrane, there is a danger that the amount of the adhering organic substances becomes too high to be neglected. The present invention solves this problem.

In an air filter unit according to the present invention, the preferable range of the amount of organic substances detected from the air filter medium is a range in which no organic substance is substantially detected, more particularly, a range not more than the limit of detection.

The term "an amount of organic substances" in the present invention means the TOC, i.e. a total amount of organic substances detected. In the present invention, the term "before using" implies, for example, before operating an air filter unit that is installed in a clean room or the like. The term "a surface area contacting with the air" in the present invention means the surface area of constructional members included in an air filter unit and the area contacting with the air after being incorporated into the air filter unit. Therefore, in the present invention, the amount of organic substances detected from the surface contacting with the air of constructional members in an air filter unit is controlled.

In the present invention, the detection methods of organic substances include a detection method by, for example, gas chromatography.

In an air filter unit according to the present invention, it is preferable that a filter medium that is bent in a waveform is housed in a frame, the gap between the filter medium and the frame is sealed by an end sealing compound and a side sealing compound and the amount of organic substances detected from the surface area contacting with the air of 3 cm$^2$ of the side sealing compound is 400 ng or less at a temperature of 40° C. The preferable range of the amount of organic substances detected is 3200 ng or less, most preferably 2800 ng or less.

In the present invention, the side sealing compound is used for sealing, for example, the gap between outer frame materials 7 and 9 of a filter unit frame and a filter medium 1 in a filter unit shown in FIG. 1. The end sealing compound is used for sealing, for example, the gap between outer frame materials 6 and 8 of a filter unit frame and a filter medium 1 in a filter unit shown in FIG. 1.

In an air filter unit according to the present invention, it is preferable that the filter medium is a minipleat-type filter medium having a belt-shaped spacer formed by a hot melt adhesive and the amount of organic substances detected from the spacer surface area (5 cm$^2$) contacting with the air is 60 ng or less at a temperature of 40° C. The preferable range of the amount of organic substances detected is 45 ng or less, most preferably 40 ng or less.

In an air filter unit according to the present invention, it is preferable that the whole air filter unit is treated for removing organic substances. In the treatment for removing organic substances, it is preferable that the whole air filter unit is heated, and that any temperature is acceptable for the heat treatment as long as the performance of the air filter unit is not deteriorated. Most preferably, the temperature is below the melting point of a constructional member that has the lowest melting point among constructional members included in the air filter unit. The treatments for removing organic substances include, for example, a treatment in which a cleaned air or a cleaned inert gas having a temperature of 40–150° C. is blown against or permeated into an air filter unit at a wind velocity of 0.1–5 m/sec for 1 sec–48 hours, a treatment in which an air filter unit is left in a cleaned air or a cleaned inert gas having the same temperature as the above or the like. The cleaned air or the cleaned inert gas can be prepared by removing organic substances and floating small particles by using a chemical filter, a ULPA or the like. The inert gases include, for example, a helium gas, a nitrogen gas, a pure air or the like.

In an air filter unit according to the present invention, at least the filter medium is kept from contacting with outside air before using. When the filter medium having the biggest surface area among the members included in the air filter unit is kept from contacting with outside air, the adhesion of organic substances present in the outside air to the filter medium is prevented. As a result, the generation of organic substances from the air filter unit can be further prevented. The member being kept from contacting with outside air is not limited to the filter medium. It is preferable that other members also are kept from contacting with outside air. Most preferably, each member being housed in a frame and the inside of the frame are kept from contacting with outside air.

In an air filter unit according to the present invention, it is preferable that an air suction port and an air exhaust port are sealed with a filter which keeps the unit from contacting with organic substances and from which organic substances are not generated. Also in this method, each member housed in a frame, for example, a filter medium, and the inside of the frame are kept from contacting with outside air. According to this method, a seal can be peeled off after installing the air filter unit in a clean room, a manufacturing facility for semiconductor or liquid crystal or the like, thus enabling each member housed in the frame and the inside of the frame to be kept from contacting with outside air until just before using the air filter unit. As a result, the cleanliness of the air filter unit can be maintained. The air filter unit can be sealed using a bag from which organic substances are not generated. The film or the bag is preferably a polyester film or a bag made of polyester, most preferably, for example, a polyethylene terephthalate (PET) film or a bag made of PET.

In the present invention, it is preferable that a filter medium included in an air filter unit according to the present invention is provided with an air-permeable supporting member on at least one surface of a PTFE porous membrane.

The structure of the PTFE porous membrane is not particularly limited and may have a single layer or a multilayer structure having 2 or more layers. The filter mediums include a filter medium provided with an air-permeable supporting member on one side of a PTFE porous membrane, a filter medium provided with an air-permeable supporting member on both sides of a PTFE porous membrane, a filter medium in which a PTFE porous membrane and an air-permeable supporting member are laminated alternately or at random or the like. Particularly, the filter medium provided with an air-permeable supporting member on both sides of a PTFE porous membrane is preferable, since the filter medium can prevent the PTFE porous membrane from forming a pin hole and the like that cause damage.

In the filter medium mentioned above, the PTFE porous membrane is not particularly limited and well-known filter mediums can be used. Particularly, the filter medium that can achieve the performance (a performance equivalent to or more than that of a HEPA filter and a ULPA filter) in collection efficiency of floating minute particles, a pressure loss or the like, which is required for a filter unit used in a clean room where semiconductor, liquid crystal or the like are manufactured or in a manufacturing equipment, is preferable. For example, it is preferable that the pressure loss is in the range of 10–100 mm $H_2O$ when permeating the air at a velocity of 5.3 cm/sec and the collection efficiency of 0.10–0.12 μm dioctyl phthalate (DOP) is 99.0% or more. Such a PTFE porous membrane is described in JP5-202217A, WO94/16802 or the like.

The PTFE porous membrane used in the present invention can be obtained by a well-known production method. For example, the PTFE porous membrane can be obtained by: paste-extruding a PTFE fine powder together with an extrusion auxiliary; obtaining a tape by roll; and drawing the tape that has not been baked or has been half-baked in a biaxial direction. This method is described in detail in JP5-202217A, WO94/16802 mentioned above or the like. The PTFE porous membrane obtained by this production method is a PTFE drawn porous membrane having a configuration in which fibrillated PTFE gets tangled together. The PTFE drawn porous membrane has a big surface area and high performance.

In the filter medium mentioned above, it is preferable that the air-permeable supporting member is substantially made of polyester fibers. It is also preferable that the air-permeable supporting member is made of polyester fibers and does not comprise polyolefin. Preferably, the air-permeable supporting member has at least two melting points. In a filter medium constructed from such an air-permeable supporting member and a PTFE porous membrane, an extremely small amount of organic substance is generated from the filter medium.

The term "polyester" implies PET, polybutylene terephthalate (PBT) or the like. However, it is preferable that the polyester is a resin of at least either one of PET or PBT or a resin of both.

Air-permeable supporting members made of glass fibers, for example, a nonwoven fabric of glass fibers, a glass fiber paper, a glass fiber air filter medium or the like are not preferable, since such materials cause the generation of boron (B).

In the filter medium mentioned above, the polyester fiber material is preferably a nonwoven fabric, particularly, a nonwoven fabric using long fibers. In the case of the nonwoven fabric using long fibers, a clean condition can be maintained from the beginning, since the nonwoven fabric using long fibers can be formed directly by melt spinning of the long fibers (nonwoven fabric formed directly by spinning).

The nonwoven fabrics using long fibers include nonwoven fabrics that are manufactured by, for example, a spunbond method, a flash spinning method and a melt blown method. In such nonwoven fabrics, a nonwoven fabric manufactured by a spunbond method is preferable. In a spunbond nonwoven fabric using polyester long fibers, the Metsuke is 10–600 g/m$^2$, preferably 15–300 g/m$^2$, further preferably 15–100 g/m$^2$. When the Metsuke is more than 100 g/m$^2$, it becomes difficult to process a filter medium in the case of processing the filter medium so as to have, for example, a pleat-type air filter (for example, the filter medium becomes difficult to be bent). In addition, the cost tends to increase.

In a nonwoven fabric using short fibers, it is necessary that a card pass through the short fibers in order to brush them and oil is therefore applied inevitably in order to keep the passage open in this process. In this case, the nonwoven fabric can be used after removing the oil. Nonwoven fabrics using short fibers include nonwoven fabrics manufactured by a needle-punch method, a water jet method or a stitch-bond method.

Polyester fiber nonwoven fabrics include, for example, a PET fiber nonwoven fabric, a PBT fiber nonwoven fabric, a nonwoven fabric having a core-sheath structure in which the core component is PET and the sheath component is PBT (a nonwoven fabric having a PET/PBT core-sheath structure), a nonwoven fabric having a core-sheath structure in which the core component is high melting point PET and the sheath component is low melting point PET (a nonwoven fabric having a high melting point PET/low melting point PET core-sheath structure), a nonwoven fabric made of conjugated fibers of PET fibers and PBT fibers, a nonwoven fabric made of conjugated fibers of high melting point PET fibers and low melting point PET fibers or the like.

The low melting point PET mentioned above means a copolymerized polyethylene terephthalate in which isophthalic acid, adipic acid, diethylene glycol, polyethylene glycol and the like are copolymerized. The high melting point PET and the mere PET are regular products having a melting point of about 260° C., which are substantially made of terephthalic acid components and ethylene glycol components. The PBT mentioned above may be a copolymer with another components.

In the filter medium mentioned above, it is preferable that the air-permeable supporting member is an air-permeable supporting member having flame resistance. The term "flame resistance" herein means that the maximum carbon length is below 150 mm according to "A method for testing flammability of a filter medium used in an air cleaner" (JACA-No.11-1977) made by Filter Medium Standard Committee in Japan Air Cleaning Association (JACA).

A method of kneading or copolymerizing a compound that exhibits flame resistance, a method of coating on the surface of fibers or the like can be employed as a method for adding flame resistance. For example, flame resistance in an air-permeable supporting member can be obtained by copolymerization, kneading or polymer-blend of an organo-phosphorus compound as a flame retarder with polyester fibers. Particularly, an air-permeable supporting member in which an organophosphorus compound as a flame retarder is copolymerized with polyester fibers is preferable, since it restrains the generation of organic substances while phosphorus itself also is not generated and the filter medium is provided with both flame resistance and cleanliness.

In the filter medium mentioned above, it is preferable that the PTFE porous membrane and the air-permeable supporting member are bonded by using a heat sealing method which is conducted by melting a part of the air-permeable supporting member, a powder such as a copolymer of polyester and tetrafluoroethylene-perfluoro alkyl vinyl ether (PFA) or the like or a hot melt adhesive in order to integrate both of the PTFE porous membrane and the air-permeable supporting member. The type of such integration can be suitably selected and used according to the kind of the air-permeable supporting member or the like.

In the integration by the adhesion mentioned above, the generation of organic substances can be controlled to a low level especially when using a polyester hot melt adhesive.

In a filter medium in which a PBT nonwoven fabric contacts with a PTFE porous membrane, for example, the nonwoven fabric having a PET/PBT core-sheath structure, it is preferable that both are integrated by, for example, heat sealing (laminate) using a heat roller. PBT is easy to be heat-sealed to the PTFE porous membrane compared to other polyester resins. For example, in the case of employing the heat sealing method using a heat roller, a process for the integration can be a continuous process, thus improving producibility of a filter medium.

In the case of integrating a filter medium and an air-permeable supporting member by heat sealing in which a part of the air-permeable supporting member is melted, the following structures can be included as a structure of the filter medium.

(1) (low melting point PET fiber nonwoven fabric):(PTFE porous membrane):(low melting point PET fiber nonwoven fabric):(high melting point PET fiber nonwoven fabric)

(2) (low melting point PET fiber nonwoven fabric):(PTFE porous membrane):(nonwoven fabric having a high melting point PET/low melting point PET core-sheath structure)

(3) (nonwoven fabric having a high melting point PET/low melting point PET core-sheath structure):(PTFE porous membrane):(nonwoven fabric having a high melting point PET/low melting point PET core-sheath structure)

(4) In (3) mentioned above, (nonwoven fabric having a high melting point PET/low melting point PET core-sheath structure) is replaced with (nonwoven fabric made of mixed fibers of high melting point PET fibers and low melting point PET fibers).

(5) (nonwoven fabric having a PET/PBT core-sheath structure):(PTFE porous membrane):(nonwoven fabric having a PET/PBT core-sheath structure)

(6) (nonwoven fabric having a PET/PBT core-sheath structure):(PTFE porous membrane):(low melting point PET nonwoven fabric)

(7) (nonwoven fabric having a PET/PBT core-sheath structure):(PTFE porous membrane):(nonwoven fabric having a high melting point PET/low melting point PET core-sheath structure)

(8) (low melting point PET fiber nonwoven fabric):(PTFE porous membrane):(nonwoven fabric made of mixed fibers of high melting point PET fibers and low melting point PET fibers)

(9) (nonwoven fabric made of mixed fibers of high melting point PET fibers and low melting point PET fibers):(PTFE porous membrane):(low melting point PET fiber nonwoven fabric):(high melting point PET fiber nonwoven fabric)

(10) (nonwoven fabric made of mixed fibers of high melting point PET fibers and low melting point PET fibers):(PTFE porous membrane):(nonwoven fabric having a PET/PBT core-sheath structure)

(11) (nonwoven fabric having a PET/PBT core-sheath structure):(PTFE porous membrane):(low melting point PET nonwoven fabric):(high melting poing PET fiber nonwoven fabric)

(12) (PBT fiber nonwoven fabric):(PTFE porous membrane):(PBT fiber nonwoven fabric)

(13) (PBT fiber nonwoven fabric):(PTFE porous membrane):(low melting point PET fiber nonwoven fabric)

(14) (PBT fiber nonwoven fabric):(PTFE porous membrane):(low melting point PET fiber nonwoven fabric):(high melting point PET fiber nonwoven fabric)

(15) (PBT fiber nonwoven fabric):(PTFE porous membrane):(nonwoven fabric having a high melting point PET/low melting point PET core-sheath structure)

(16) (PBT fiber nonwoven fabric):(PTFE porous membrane):(nonwoven fabric made of mixed fibers of high melting point PET fibers and low melting point PET fibers)

(17) (PBT fiber nonwoven fabric):(PTFE porous membrane):(nonwoven fabric having a PET/PBT core-sheath structure)

(18) (low melting point PET fiber nonwoven fabric): (PTFE porous membrane):(low melting point PET fiber nonwoven fabric)

(19) (high melting point PET fiber nonwoven fabric): (PTFE porous membrane):(high melting point PET fiber nonwoven fabric)

In a type of adhesion using a hot melt adhesive, a preferable polyester fiber material to be used is a nonwoven fabric made of PET such as a nonwoven fabric made of high melting point PET fibers, low melting point PET fibers, mixed fibers of high melting point PET fibers and low melting point PET fibers, high melting point PET/low melting point PET core-sheath fibers or the like.

The adhering method is not especially limited and well-known methods can be used. However, based on the reason that the quantity of airflow in the air-permeable supporting member should not be damaged, a method such as a spray-application method, a spiral spray-application method, a slot spray-application method, a melt blown application method, a printwheel application method, a ribbon lip application method or the like can be preferably employed. It is preferable that a hot melt adhesive be used to restrain the generation of organic substance in a low level and also it is cheap when used as the adhering method mentioned above.

Next, a method for manufacturing an air filter unit according to the present invention comprises treating the whole air filter unit for removing organic substances after assembling the air filter unit. The assembly of the air filter unit can be carried out by, for example, housing a filter medium that is bent in a waveform in a frame and sealing the gap between the filter medium and the frame by means of a sealing compound.

In a method for manufacturing an air filter unit according to the present invention, the treatment for removing organic substances is preferably a treatment by heating the whole air filter unit. The conditions and methods of the treatment are as mentioned above. In a method for manufacturing an air filter unit according to the present invention, it is preferable that after removing organic substances, an air suction port and an air exhaust port of the air filter unit are sealed with a filter which keeps the unit from contacting with organic substances and from which organic substances are not generated. The conditions and the like are as mentioned above.

According to the method for manufacturing an air filter unit of the present invention, after the treatment for removing organic substances, the amount of adhering organic substances in a filter medium in the air filter unit can be reduced to ½ or less, preferably ⅓ or less, more preferably ¼ or less compared to the amount before the treatment. Similarly, the amount can be reduced to ½ or less in a separator, to ¾ or less in an end sealing component, to ½ or less in a side sealing component, to ½ or less in a frame, to ¼ or less in a gasket, to ½ or less in a spacer and to ½ or less in the whole air filter unit compared to the amount before the treatment.

Next, a method of use of an air filter unit according to the present invention comprises: assembling an air filter unit; treating the whole air filter unit for removing organic substances; and then using the air filter unit. The treatment mentioned above for removing organic substances is preferably a heat treatment of the whole air filter unit as in the case mentioned above. The conditions and the like are as mentioned above.

DETAILED DESCRIPTION OF THE INVENTION

The present invention will be explained further in detail based on the drawings as follows.

Figure 1:
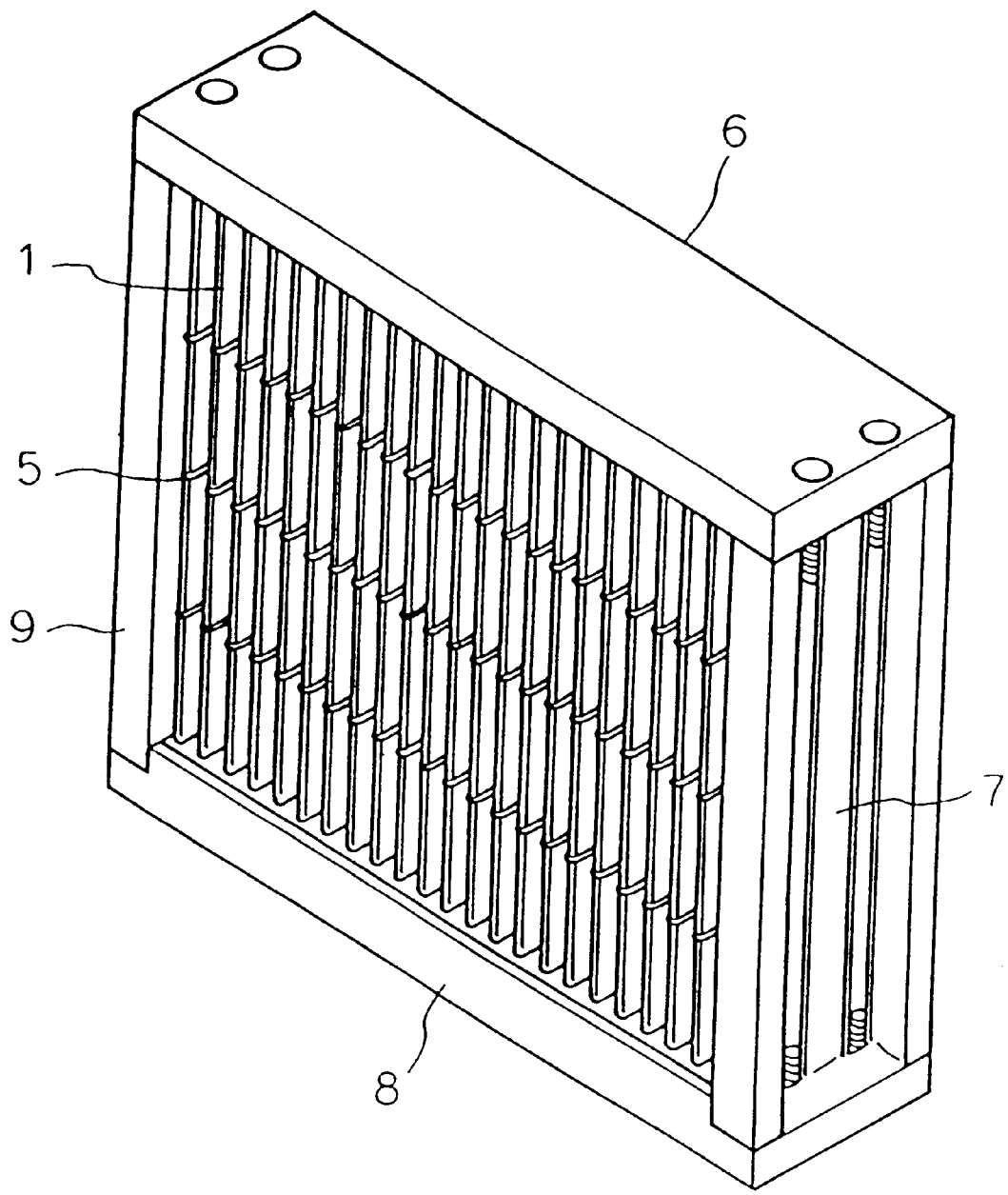
FIG. 1 shows a perspective view of an air filter unit according to an embodiment of the present invention.

An example of an air filter unit according to the present invention is shown in the perspective view of FIG. 1. As shown in the figure, the air filter unit is called a "minipleat-type". A filter medium 1 is usually bent in a waveform having a width of 25–50 mm and the distance between the waves (between the wave crests) is generally 2–5 mm. The distance is maintained by a plurality of spacers 5 that are formed in a ribbon shape or a belt shape using a hot melt adhesive (for example, Diabond (trade name)). The distance between the spacers 5 is normally about 25–50 mm. The filter medium 1 is housed in a frame composed of 4 frame members 6, 7, 8 and 9, and the gap between the frame and the filter medium 1 is sealed in order to retain airtightness. The seal can be classified crudely into, for example, a side seal and an end seal. For example, a hot melt adhesive (for example, Diabond (trade name)) can be used as a seal component for the seal. The materials for the frame include, for example, stainless steel, aluminum and polyvinyl chloride (PVC). The size of the air filter unit according to the present invention can be decided suitably according to the application. In the air filter unit, a gasket may be provided as a constructional member.

Figure 2:
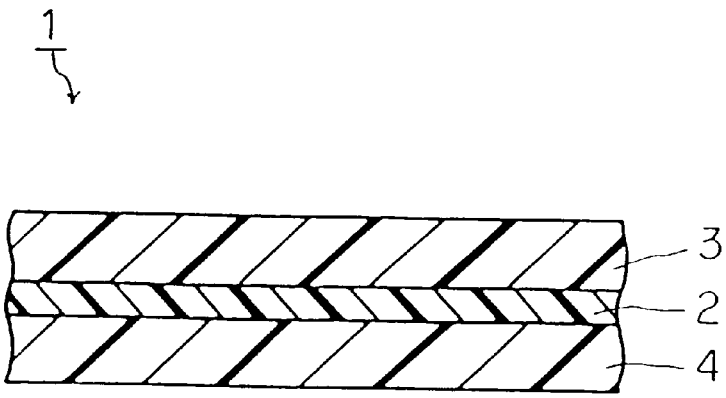
FIG. 2 shows a cross-sectional view of a filter medium according to an embodiment of the present invention.

In the cross-sectional view of FIG. 2, the configuration of the filter medium used in the air filter unit according to the present invention is illustrated. In FIG. 2, the numeral 1 indicates a whole filter medium, 2 indicates a PTFE porous membrane having, for example, a Metsuke of 2 g/m$^2$ and a thickness of 4 μm, and 3 and 4 indicate air-permeable supporting members made of, for example, a polyester long-fiber spunbonded nonwoven fabric, for example, a product of Toyobo Co., Ltd.: the fineness (the size of a single fiber)/2 denier, and the Metsuke/15–100 g/m$^2$, preferably 20–70 g/m$^2$. The PTFE porous membrane 2 and the air-permeable supporting members 3 and 4 made of the non-woven fabric can be bonded by applying, for example, a polyester hot melt adhesive (for example, Diabond (trade name), NOGAWA CHEMICAL CO., LTD.) of 1–20 g/m$^2$, preferably 2–10 g/m$^2$ and by thermobonding in a temperature range of 160–200° C. The thickness of the whole filter medium 1 is 100–1500 μm, preferably 100–700 μm. It is preferable that the filter medium 1 has a pressure loss of 10–100 mmH$_2$O (condition:5.3 cm/sec), collection efficiency of DOP having a particle diameter of 0.10–0.12 μm of at least 99.0% (conditions: 5.3 cm/sec, 0.1 μm) and a pore diameter in a range of 0.2–3 μm.

Figure 3:
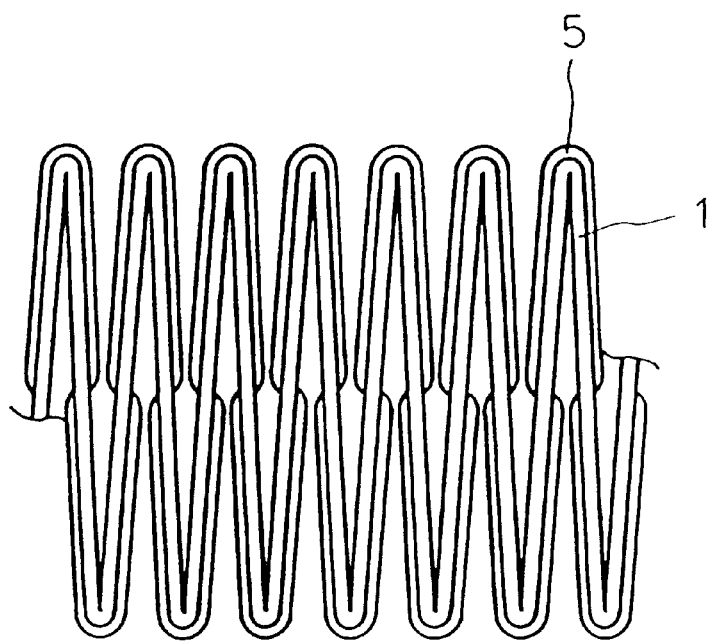
FIG. 3 shows a cross-sectional view of a part of a spacer in the air filter unit shown in FIG. 1.

In FIG. 3, a cross-sectional view of a part of a spacer 5 of the filter medium 1 in the air filter unit is shown. As shown in the figure, the spacer 5 is formed for each crest of waves of the filter medium 1 bent in a waveform and the shape of its cross-section is substantially a V-shape along the waveform of the filter medium. The length of the spacer 5 is determined suitably by the width of the part bent of the filter medium 1. However, it is generally preferable that the length of one leg of the substantial V-shape is about half of the width of the part bent mentioned above. For example, in the case where the width of the part bent of the filter medium 1 is about 40 mm, the length of one leg of the substantial V-shape of a spacer 5 is preferably about 20 mm. The wave shape of the filter medium 1 is maintained by forming the spacer 5, which enables the air to pass through uniformly.

This air filter unit is treated for removing organic substances as mentioned above. This treatment for removing organic substances is usually conducted by heating the whole air filter. The treatments for removing organic substances include, for example, a treatment in which an air filter unit is left in heated cleaned air or in a heated cleaned inert gas and a treatment in which the heated cleaned air or the like is blown against the air filter unit as mentioned above. The cleaned air and the cleaned inert gas can be obtained by using other air filter units such as a HEPA, a ULPA, a chemical filter or the like. In the case of leaving the air filter unit, the treatment mentioned above is conducted generally at 40–120° C. for 5 minutes–24 hours, preferably at 50–100° C. for 10–180 minutes. In the case of blowing heated cleaned air or the like against the air filter unit, the treatment is generally conducted at a temperature of 25–150° C. for 0.5–300 minutes in a range of the velocity of flow of the cleaned air or the like of 0.5 cm/sec–5 m/sec, preferably at a temperature of 30–120° C. (most preferably 40–100° C.) for 0.5–60 minutes in a range of the velocity of flow of the cleaned air or the like of 1 cm/sec–1 m/sec.

Figure 4:
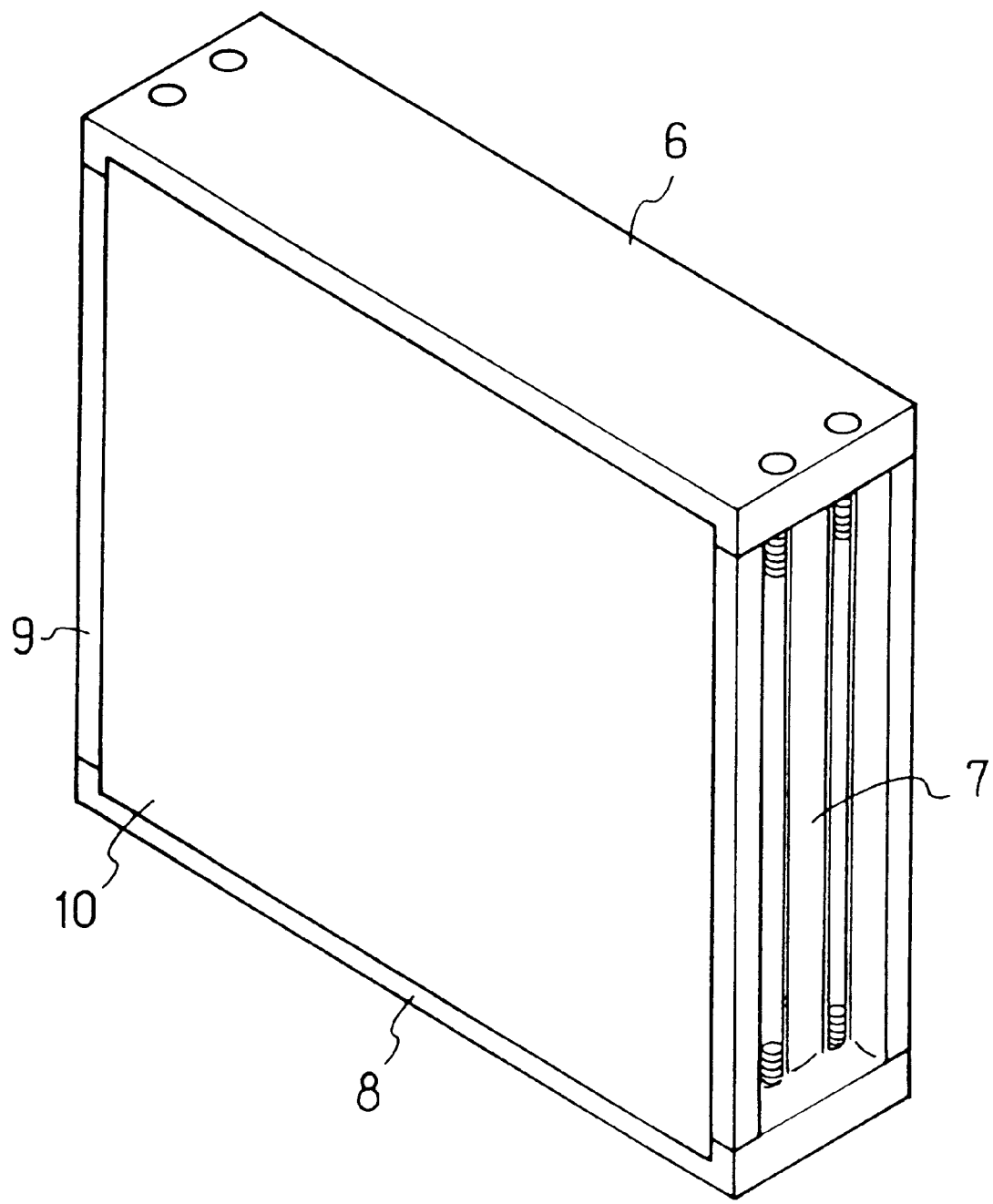
FIG. 4 shows a perspective view illustrating the condition that an air suction port and an air exhaust port are sealed with a film in the air filter unit of the embodiment shown in FIG. 1

After the treatment for removing organic substances, it is preferable that the inside of a frame and each member housed therein are kept from contacting with outside air by sealing an air suction port and an air exhaust port of the air filter unit with a predetermined film such as a PET film or the like. A perspective view in FIG. 4 shows an example in which the air filter unit according to the present invention is in the condition that the suction port and the exhaust port are sealed with a film 10. In FIG. 4, the same parts as in FIG. 1 are indicated by the same numbers. Materials for the film other than the PET include fluororesin such as tetrafluoroethylene-perfluoroalkylvinylether copolymer resin (PFA) or the like, PTB and the like. Methods for sealing include methods by heat sealing and by using an adhesive. The adhesive is preferably a hot melt adhesive from which less organic substances are generated as mentioned above. It is preferable that the film is peeled off just before using the air filter unit installed in a clean room or the like. Thus, the cleanliness of the air filter unit can be maintained until just before the use. The whole air filter unit may be covered with a film packing material having a property keeping the unit from contacting with organic substances from which organic substances are not generated. This method enables the cleanliness of the whole air filter to be maintained.

An example of a minipleat-type air filter unit using a spacer was explained above. However, the present invention is not limited to the example and can be applied for a separator-type air filter unit using a separator.

Figure 5:
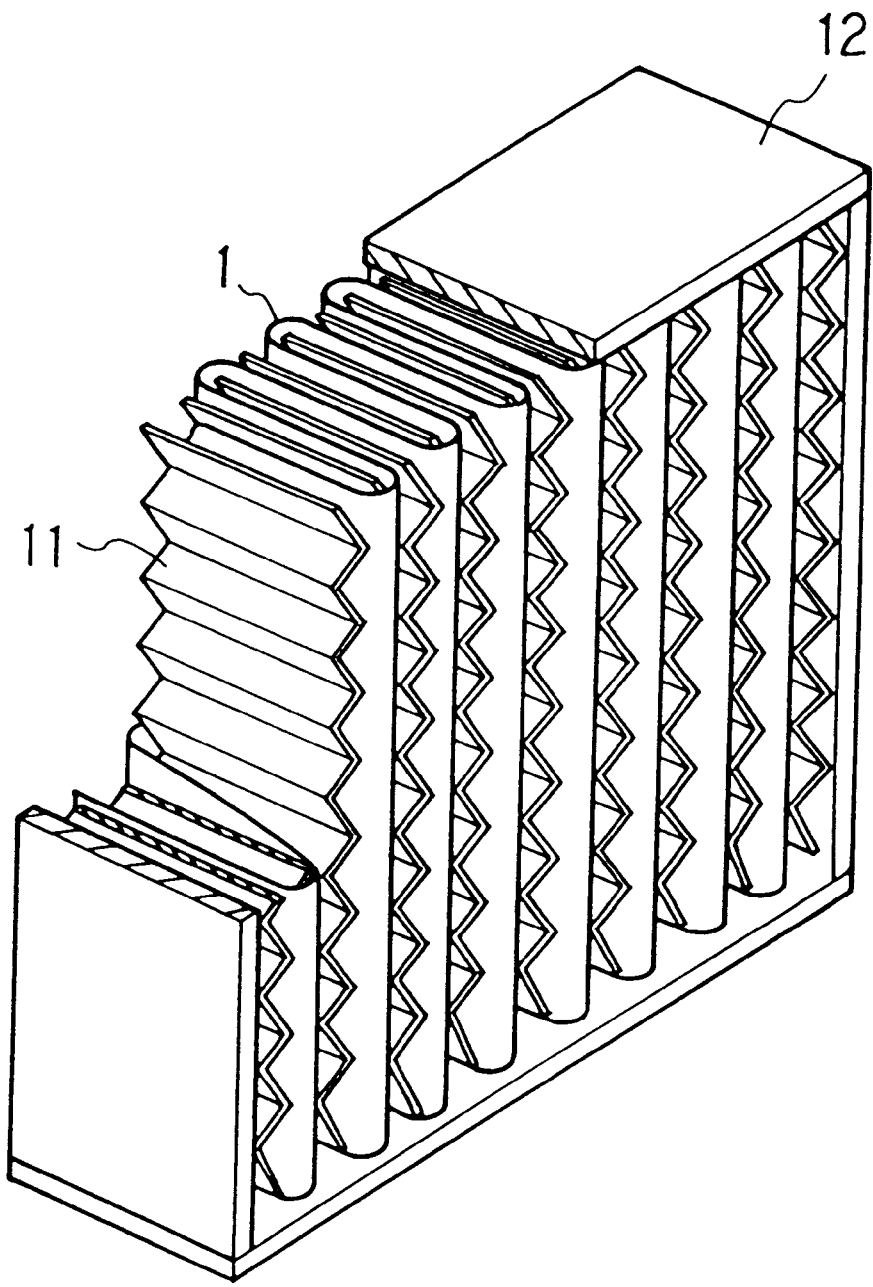
FIG. 5 shows a partially cutaway perspective view of an air filter unit of another embodiment according to the present invention.

A partially cutaway perspective view in FIG. 5 shows an example of a configuration of the separator-type air filter unit. As shown in the figure, a filter medium 1 is bent in a waveform through a corrugated separator 11 and is housed in a frame 12 in this air filter unit. The gap between the filter medium 1 and the frame 12 is sealed by a sealing compound as in the minipleat-type air filter unit mentioned above. Materials for the separator 11 include, for example, aluminum and plastic paper. Generally, this separator 11 has a thickness of 0.1–2.0 mm and the height of the wave (the height of the wave crest) is usually 1–10 mm. Other conditions and configurations are the same as in the minipleat-type air filter unit.

The treatment of the separator-type air filter unit for removing organic substances and the sealing of the suction port and the like are conducted as in the minipleat-type air filter unit mentioned above.

EXAMPLES

Next, examples will be explained together with comparative examples. In the examples, a pressure loss, permeability, collection efficiency in a filter medium and the amount of organic substances (TOC) in an air filter unit were measured by the following methods.

(1) A method for measuring a pressure loss in a filter medium

A test sample was cut so as to have a round shape having a diameter of 47 mm and was set in a holder having a permeable effective area of 12.6 cm$^2$, thus measuring a pressure loss at a wind velocity of 5.3 cm/sec.

(2) Permeability of a filter medium

A test sample was set in a holder having a diameter of 100 mm and the flow rate of the air passing through the sample was set at 5.3 cm/sec. Under this condition, polydisperse DOP (dioctyl phthalate) particles having a concentration of 10$^7$/300 ml were introduced upstream of the sample. The number of particles having a particle size of 0.1 μm was measured at each side, upstream and downstream, of the sample by a particle counter (product of PMS company, LAS-X-CRT), thus determining the permeability (%) of the particles from the ratio.

(3) Collection efficiency (%) in a filter medium

The collection efficiency was determined by the following formula.

Collection efficiency (%)=100−Permeability (%)

(4) Measurement of organic substances

The measurement of organic substances was conducted by a purge and trap method using gas chromatography. First, a filter medium, an end sealing compound, a side sealing compound, a spacer, a gasket and a frame, which were constructional members of an air filter unit, were sampled in the following manner. The filter medium was cut off to a test piece of 5×5 cm (25 cm$^2$) exactly using scissors, the edge of the blades of which had been washed with acetone sufficiently. The end sealing compound was cut off from a dismantled unit using a cutter, the edge of the blade of which had been washed with acetone sufficiently, so that the sample would have a surface area contacting with the air of 2 cm$^2$. The side sealing compound also was cut off so that the sample would have a surface area contacting with the air of 3 cm$^2$. Similarly, the spacer is cut off so that the sample would have a surface area contacting with the air of 5 cm$^2$. Further, the gasket also was cut off so that the sample would have a surface area contacting with the air of 2.7 cm$^2$. The frame was cut off from the unit using a hacksaw, the edge of the blade of which had been washed with acetone sufficiently, so that the sample would have a surface area contacting with the air of 14 cm$^2$. The analysis samples were prepared by aeration of a pure helium gas to the samples that had been sampled in the manners mentioned above at room temperature for 24 hours. These analysis samples were put into a sample tube that had been pre-warmed to 40° C. and volatile components, gas compositions and the like that had been generated from the analysis samples were purged from the sample tube by blowing an inert gas (He gas) at a velocity of 50 ml/min for 15 minutes. The purged volatile components and the like were introduced into a trap tube. In this trap tube, the volatile components and the like were accumulated and condensed (trapped) into an absorbent (quartz wool) cooled at −40° C. Then, the absorbent was instantly heated to 358° C. and the adsorbate that the absorbent had adsorbed was emitted as a gas for 20 seconds. The emitted gas was introduced to a gas chromatography and its amount (TOC) was measured. The measurement conditions were as follows.

Gas Chromatography: GC14A, product of Shimadzu Corp.

Column: FRONTIER LAB Ultra ALLOY Capillary Column, UA-5

Column Temperature: 50° C. (maintaining for 5 minutes) →250° C. (maintaining for 10 minutes), a programming rate of 10° C./min Split Ratio: 1:50 (a column flow rate of 1.0 ml/min)

Example 1

A PTFE porous film was manufactured according to the production method described in WO94/16802. That is, the PTFE fine powder (POLYFLON, a product of DAIKIN INDUSTRIES, LTD.) was paste-extruded together with an extrusion auxiliary and was rolled, thus forming a film-shape having a thickness of 100 μm. Then, this film was drawn by 10 times in the longitudinal direction at a temperature of 300° C. and by 20 times in the cross direction at a temperature of 200° C., thus obtaining a PTFE porous membrane having a thickness of 5 μm, a mean pore diameter of 0.35 μm, a pressure loss of 42 mmH$_2$O, permeability of 0.0000027%, collection efficiency of 99.9999973%.

As a next step, a long-fiber spunbonded nonwoven fabric (a product of UNITIKA, LTD, ELEVES T0703WDO, a fineness of 3 denier and a Metsuke of 70 g/m$^2$) made of polyethylene and polyester was prepared as an air-permeable supporting member. A spunbonded nonwoven fabric having a two-layer structure (a product of UNITIKA, LTD, ELEFIT E0303WTO, a fineness of 3 denier and a Metsuke of 30 g/m$^2$) made of two kinds of fibers, a conjugated fiber having a core/sheath structure using polyester for the sheath part and a conjugated fiber having a core/sheath structure using modified polyester for the sheath part and polyester for the core part, was prepared as another air-permeable supporting member. The PTFE porous membrane was sandwiched between the two kinds of air-permeable supporting members mentioned above, and the 3 parts were integrated through heat sealing by contacting with a thermal roll having a temperature of 200° C. at a line velocity of 10 m/min, thus producing a filter medium. This filter medium has a mean pore diameter of 0.35 μm, a pressure loss of 42 mmH$_2$O, permeability of 0.0000027%, collection efficiency of 99.9999973%.

This filter medium was folded so as to have a width of 40 mm and bent in a waveform. The filter medium was housed into the inside of a frame (a depth of 65 mm) made of aluminum having a square shape (an outer size of a side of the square was 610 mm) of a surface from which air flow comes in and out. The side part and the end part were sealed by a polychloroprene rubber adhesive and a polyurethane adhesive (KU850, a product of KONISHI CO., LTD.) respectively, thus producing an air filter unit having a configuration shown in FIG. 1, in which the shape of the surface from which air flow comes in and out was square (the effective size of a side of the square was about 580 mm). In the filter medium mentioned above, a plurality of spacers were formed using a hot melt adhesive (polyamide) in order to maintain the regular distance between pleats. The spacer had a height of 2 mm and the distance between the spacers was 25 mm. In this air filter unit, a gasket was mounted to the frame part of the unit. Surface areas (unit area) contacting with the air of each constructional member in this air filter unit and area ratios of each constructional member for the whole area of the air filter unit are shown in Table 1 below.

TABLE 1

AREA RATIO OF EACH CONSTRUCTIONAL MEMBER IN THE AIR FILTER UNIT

| Members | Unit Area (cm$^2$) | Area Ratio (%) |
|---|---|---|
| Filter Medium | 118030 | 91.74 |
| Spacer | 6716 | 5.22 |
| End Sealing Compound | 638 | 0.50 |
| Side Sealing Compound | 35 | 0.03 |
| Gasket | 1559 | 1.21 |
| Frame | 1674 | 1.30 |
| Total | 128651 | 100.00 |

*minipleat: 610 × 610 mm

The cleaned air that had passed through a chemical filter for removing an organic gas (a product of NIPPON MUKI CO., LTD., an ACS filter) and a ULPA (a product of DAIKIN INDUSTRIES, LTD., Neurofine, grade: KM)was heated to 80° C. The heated cleaned air was blown against the air filter unit at a filter permeation wind velocity of 50 ml/min for 15 minutes, thus removing organic substances.

Comparative Example 1

An air filter unit was manufactured as in Example 1 except the treatment for removing organic substances.

In the air filter units obtained in Example 1 and Comparative Example 1, the amount of organic substances (TOC amount) was measured by the method mentioned above. The results are shown in Table 2 below. In Table 2, the column "Treated" indicates results in Example 1 and the column "Untreated" indicates results in Comparative Example 1.

TABLE 2

| Member | Sampling Area (cm$^2$) | TOC Amount (ng) Treated | TOC Amount (ng) Untreated | TOC Amount Converted into Unit Treated | TOC Amount Converted into Unit Untreated |
|---|---|---|---|---|---|
| Filter medium | 25.0 | 6 | 169 | 27 | 798 |
| Spacer | 5.0 | 33 | 78 | 44 | 105 |
| End Sealing Compound | 2.0 | 538 | 766 | 186 | 244 |
| Side Sealing Compound | 3.0 | 2510 | 5337 | 29 | 62 |
| Gasket | 2.7 | 33 | 1402 | 2 | 65 |
| Frame | 14.0 | 5 | 33 | 0 | 3 |
| Total | — | — | — | 288 | 1278 |

Treatment: Heating in a He atmosphere (a velocity of 50 ml/min) at 80° C. for 60 minutes As can be seen from Table 2 above, an extremely small amount of organic substance was detected from the whole air filter unit of Example 1 that had been treated for removing organic substances compared to that detected from the unit of Comparative Example 1 that had not been treated.

Example 2

Right after an air filter unit was manufactured as in Example 1, the air filter unit was put into a Lumilar bag having a PET layer on its inner wall. The bag was sealed by heat sealing after replacing the inside air with a nitrogen gas and was left for 30 days.

Reference Example

An air filter unit was manufactured as in Example 1 and was left for 30 days.

In each air filter unit of Example 2 and Reference Example, the amount of organic substances (TOC amount) of constructional members such as a filter medium and the like was measured by the method mentioned above. The results are shown in Table 3 below.

TABLE 3

| Member | Sampling Area (cm$^2$) | Example 2 (sealed) Right after the treatment | Example 2 (sealed) After 30 days | Reference Example (not sealed) Right after the treatment | Reference Example (not sealed) After 30 days |
|---|---|---|---|---|---|
| Filter medium | 25.0 | 8 | 9 | 6 | 166 |
| Spacer | 5.0 | 32 | 36 | 31 | 79 |
| End Sealing Compound | 2.0 | 583 | 611 | 560 | 727 |
| Side Sealing Compound | 3.0 | 2523 | 2541 | 2551 | 3384 |
| Gasket | 2.7 | 35 | 42 | 38 | 328 |
| Frame | 14.0 | 6 | 7 | 5 | 37 |

As can be seen from Table 3 above, an extremely small amount of organic substance was detected from the air filter unit of Example 2 that had been packed with a bag compared to that detected from the unit of Reference Example that had not been packed.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method of use of an air filter unit, comprising:

assembling an air filter unit; and treating the air filter unit for removing organic substances before using the air filter unit.

2. A method of use of an air filter unit according to claim 1, wherein the treatment for removing organic substances is a treatment including heating the whole air filter unit.

3. An air filter unit comprising a filter medium, wherein before use of the air filter unit a 5×5 cm$^2$ test piece of the filter medium yields 100 ng or less of organic substances at a temperature of 40° C.

4. An air filter unit according to claim 3, wherein the filter medium is bent in a waveform shape and housed in a frame, further comprising a sealing compound for sealing a gap between the filter medium and the frame, said sealing compound yielding 4000 ng or less of organic substances at a temperature of 40° C. for each surface area of 3 cm$^2$ contacting air.

5. An air filter unit according to claim 4, wherein the filter medium is a minipleat filter medium having a belt-shaped spacer formed by a hot melt adhesive, said spacer yielding 60 ng or less of organic substances at a temperature of 40° C. for each surface area of 5 cm$^2$ contacting air.

6. An air filter unit according to claim 3, wherein the air filter unit is treated for removing organic substances.

7. An air filter unit according to claim 6, wherein the treatment for removing organic substances is a treatment including heating the whole air filter unit.

8. An air filter unit according to claim 3, wherein at least the filter medium is kept from contacting with outside air before using.

9. An air filter unit according to claim 8, wherein an air suction port and an air exhaust port of the air filter unit are sealed with a film before using, the film keeping the unit from contacting with organic substances and organic substances being not generated from the film itself.

10. An air filter unit according to claim 9, wherein the film is a polyester film.

11. An air filter unit according to claim 3, wherein the filter medium is provided with an air-permeable supporting member on at least one surface of a polytetrafluoroethylene porous membrane.

12. An air filter unit according to claim 11, wherein the polytetrafluoroethylene porous membrane is a polytetrafluoroethylene drawn porous membrane having a configuration in which fibrillated polytetrafluoroethylene gets tangled together.

13. An air filter unit according to claim 11, wherein the air-permeable supporting member is substantially made of polyester fibers.

14. An air filter unit according to claim 13, wherein the polyester is a resin of at least either one of polyethylene terephthalate or polybutylene terephthalate.

15. An air filter unit according to claim 13, wherein the polyester is a resin of the both polyethylene terephthalate and polybutylene terephthalate.

16. An air filter unit according to claim 11, wherein the air-permeable supporting member is substantially made of polyester fibers and is free of polyolefine.

17. An air filter unit according to claim 16, wherein the air-permeable supporting member has at least two melting points.

18. An air filter unit according to claim 11, wherein the air-permeable supporting member is formed by a nonwoven fabric made of polyester fibers.

19. An air filter unit according to claim 11, wherein the polytetrafluoroethylene porous membrane and the air-permeable supporting member are bonded by a hot melt adhesive.

20. A method for manufacturing an air filter unit, the air filter unit being treated for removing organic substances after assembling the air filter unit.

21. A method for manufacturing an air filter unit according to claim 20, wherein the treatment for removing organic substances is a treatment including heating the whole air filter unit.

22. A method for manufacturing an air filter unit according to claim 20, wherein an air suction port and an air exhaust port of the air filter unit are sealed with a film after the treatment for removing organic substances, the film keeping the unit from contacting with organic substances and organic substances being not generated from the film itself.

23. A method for manufacturing an air filter unit according to claim 20, wherein the film is a polyester film.

* * * * *